Dec. 8, 1925. 1,564,736
J. S. WHELAN ET AL
HAND REST
Filed Dec. 23, 1924
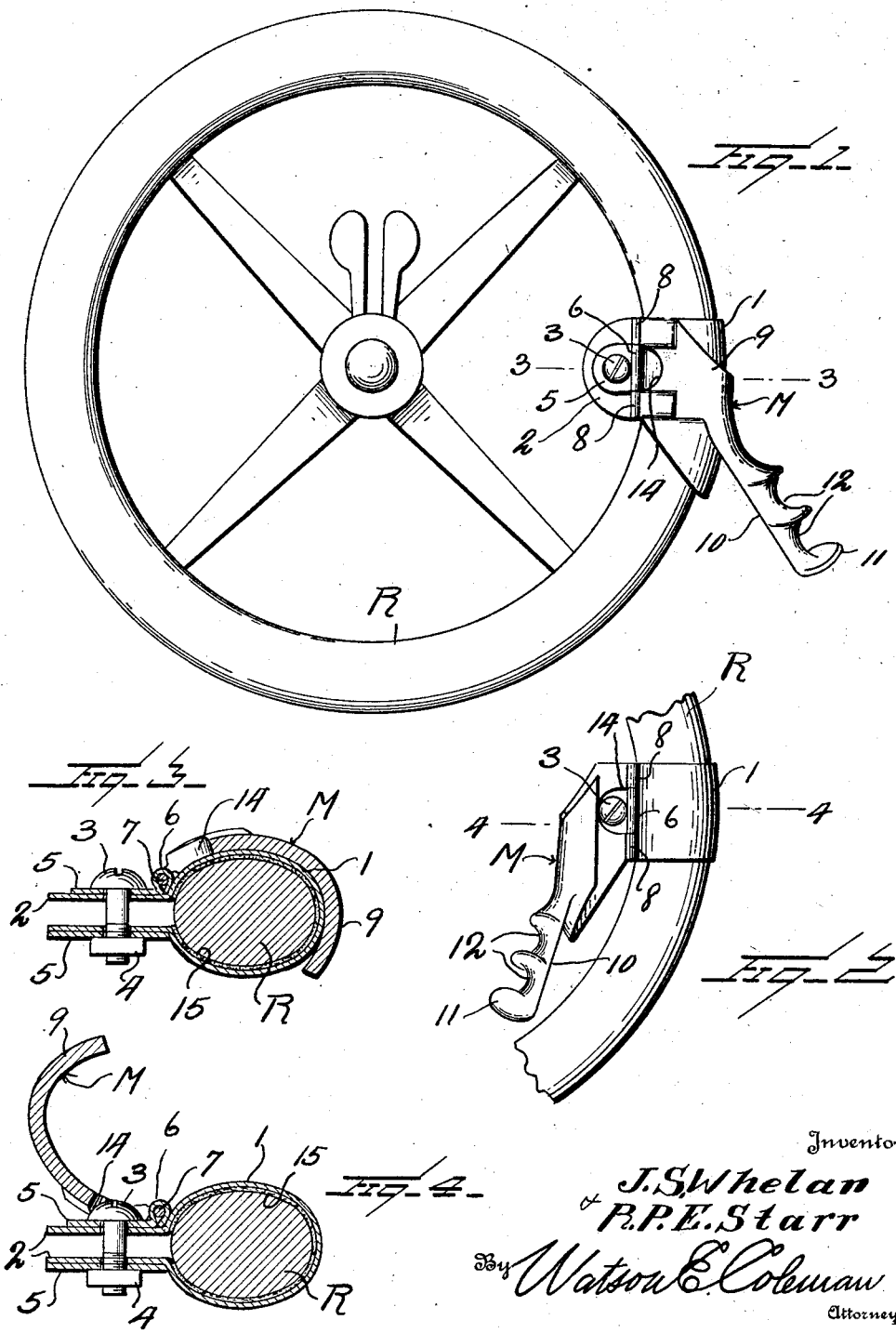

Patented Dec. 8, 1925.

1,564,736

UNITED STATES PATENT OFFICE.

JOSEPH S. WHELAN AND ROBERT P. ELLIS STARR, OF CONCORDIA, KANSAS.

HAND REST.

Application filed December 23, 1924. Serial No. 757,695.

*To all whom it may concern:*

Be it known that we, JOSEPH S. WHELAN and ROBERT P. ELLIS STARR, citizens of the United States, residing at Concordia, in the county of Cloud and State of Kansas, have invented certain new and useful Improvements in Hand Rests, of which the following is a specification, reference being had to the accompanying drawings.

This invention relates to certain improvements in hand rests and it is an object of the invention to provide a novel and improved device of this character adapted to be attached to the steering wheel of an automobile or the like so that a hand engaged with said wheel may be supported with a maximum of comfort.

Another object of the invention is to provide a novel and improved device of this general character which when desired may be readily thrown inwardly of the wheel into an inoperative position.

The invention consists in the details of construction and in the combination and arrangement of the several parts of our improved hand rest whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view in top plan of a steering wheel having applied thereto an attachment constructed in accordance with an embodiment of our invention;

Figure 2 is a fragmentary view in plan with my improved attachment in an inoperative position;

Figure 3 is a sectional view taken substantially on the line 3—3 of Figure 1;

Figure 4 is a sectional view taken substantially on the line 4—4 of Figure 2.

As disclosed in the accompanying drawing, R denotes the rim of a steering wheel of the general type employed in connection with automobiles or the like and to which our improved attachment is adapted to be attached.

As herein disclosed, our improved attachment comprises a relatively broad split member 1 adapted to be disposed around the rim R, the extremities of said member 1 being continued by the outstanding ears 2 through which is directed a bolt 3 having associated therewith a nut 4, said bolt 3 and nut 4 providing means whereby the member 1 may be effectively clamped in desired position upon the rim R.

The ears 2 are strengthened or reinforced by the plates 5 welded or otherwise secured thereto and one of said plates at its inner portion is provided with an upstanding barrel or knuckle 6 through which is directed a pintle 7, said pintle being also disposed through the spaced knuckles or barrels 8 carried by the inner end of the supporting member M, the barrel or knuckle 6 snugly fitting between the knuckles or barrels 8. By this means the member M is supported for swinging movement so that when desired the member M may be thrown inwardly of the rim R and in an inoperative position as is particularly illustrated in Figures 2 and 4 of the accompanying drawing.

The member M comprises an inner body or plate 9 arcuate in cross section and which has a portion in close contact with the periphery of the split member 1 when said member M is in working or extended operative position, the knuckles or barrels 8 hereinbefore referred to being directly carried by the inner edge or margin of said plate 9. The outer side marginal portion of the plate 9 at a desired point inwardly of its inner end is provided with an outwardly directed and laterally inclined arm 10 having its outer or free end portion terminating in the outstanding lip or flange 11 and the portions of said arm inwardly of said flange 11 provided with the finger receiving grooves 12 disposed transversely of the arm.

When the plate 9 is in contact with the member 1 the arm 10 is disposed outwardly beyond the periphery of the rim R and provides a convenient rest or support for the hand of the driver whereby the steering operation may be performed with decided comfort and ease. When desired, the arm 10 may be readily swung or thrown inwardly of the rim R into inoperative position and in order to provide for the greatest possible inward swinging movement, the pivoted marginal portion of the plate 9 is cut away, as at 14, to compensate for the head of the bolt 3.

In applying the split member 1 we find it of advantage to provide the same with a liner 15 of suitable material so that the finish of the rim R will not be unduly impaired and at the same time assuring a more effective securement.

From the foregoing description it is thought to be obvious that a hand rest constructed in accordance with our invention is particularly well adapted for use by reason of the convenience and facility with which it may be assembled and operated, and it will also be obvious that our invention is susceptible of some change and modification, without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination with the rim of a steering wheel, a hand rest attachment comprising a member secured to said rim, a plate, means for pivotally connecting a marginal portion of the plate with the member, said plate when in one position having close contact with the member, and an outwardly inclined arm carried by the plate, said arm being disposed outwardly with respect to the rim when the plate is in contact with the member.

2. In combination with the rim of a steering wheel, a hand rest attachment comprising a member secured to said rim, and an arm pivotally connected with the member and movable to a position extending outwardly of the rim or inwardly of the rim, the outer end portion of the arm being provided with a lip angularly disposed with respect to the longitudinal axis of the arm.

3. In combination with the rim of a steering wheel, a hand rest attachment comprising a member secured to said rim, and an arm pivotally connected with the member and movable to a position extending outwardly of the rim or inwardly of the rim, the outer end portion of the arm being provided with a lip angularly disposed with respect to the longitudinal axis of the arm, and with finger grooves disposed transversely thereof.

In testimony whereof we hereunto affix our signatures.

JOSEPH S. WHELAN.
R. P. ELLIS STARR.